US009637612B2

(12) United States Patent
Moaseri et al.

(10) Patent No.: US 9,637,612 B2
(45) Date of Patent: May 2, 2017

(54) METHOD FOR ALIGNING HIGH ASPECT RATIO MATERIALS AND COMPOSITIONS THEREFROM

(71) Applicant: Ferdowsi University of Mashhad, Mashhad (IR)

(72) Inventors: Ehsan Moaseri, Mashhad (IR); Morteza Maghrebi, Mashhad (IR); Majid Baniadam, Mashhad (IR)

(73) Assignee: FERDOWSI UNIVERSITY OF MASHHAD, Mashhad (IR)

( * ) Notice: Subject to any disclaimer, the term of this patent is extended or adjusted under 35 U.S.C. 154(b) by 0 days.

(21) Appl. No.: 14/479,818

(22) Filed: Sep. 8, 2014

(65) Prior Publication Data
US 2015/0147560 A1    May 28, 2015

Related U.S. Application Data

(60) Provisional application No. 61/880,503, filed on Sep. 20, 2013.

(51) Int. Cl.
*B82Y 40/00* (2011.01)
*C08K 7/06* (2006.01)
*C08K 7/24* (2006.01)
*B01J 37/34* (2006.01)
*B01J 21/18* (2006.01)
*B01J 35/00* (2006.01)

(52) U.S. Cl.
CPC ............ *C08K 7/24* (2013.01); *C08K 7/06* (2013.01); *B01J 21/185* (2013.01); *B01J 35/0033* (2013.01); *B01J 37/342* (2013.01); *B82Y 40/00* (2013.01); *C08K 2201/011* (2013.01); *C08K 2201/016* (2013.01); *Y10T 428/249942* (2015.04)

(58) Field of Classification Search
None
See application file for complete search history.

(56) References Cited

U.S. PATENT DOCUMENTS 5,006,422 A * 4/1991 Sakurai ................. G06K 7/082
                                                    360/131
5,295,837 A * 3/1994 Gilano ................... G09F 9/375
                                                    434/309

(Continued)

*Primary Examiner* — Kevin Bernatz
(74) *Attorney, Agent, or Firm* — NovoTechIP International PLLC (57) ABSTRACT

A method for alignment of high aspect ratio materials (HARMs) within a liquid matrix by means of magnetic particles. The application of an external magnetic field creates a forced motion of the magnetic particles. This in turn leads to a laminar flow within the matrix which imposes a drag force on the HARMs, aligning the HARMs across the matrix. The used magnetic particles eventually accumulate at one end side of the matrix container and can be removed either by an incision or an extraction process. Unlike the previously proposed methods, there is no need for the magnetic particles to be attached either physically or chemically to the HARMs. Thus, the ultimate aligned HARMs are mostly pure and free of any magnetic particles. Once the matrix is a polymeric solution, the mentioned method is capable of synthesis of aligned HARMs-polymer composites, which exhibit improved mechanical and electrical properties.

20 Claims, 7 Drawing Sheets

(56) References Cited

U.S. PATENT DOCUMENTS

| | | | | |
|---|---|---|---|---|
| 5,411,398 A * | 5/1995 | Nakanishi | B43L 1/008 | 273/239 |
| 5,788,506 A * | 8/1998 | Chabay | G09B 23/181 | 252/62.51 R |
| 6,283,812 B1 * | 9/2001 | Jin | B82Y 10/00 | 445/24 |
| 6,774,879 B2 * | 8/2004 | Miyamoto | G02F 1/167 | 345/84 |
| 7,357,984 B2 * | 4/2008 | Otobe | B82Y 30/00 | 428/357 |
| 8,057,889 B2 * | 11/2011 | Filippov | B29C 71/00 | 264/177.12 |
| 8,652,386 B2 * | 2/2014 | Hong | H01F 1/44 | 252/70 |
| 8,748,504 B2 * | 6/2014 | Elimelech | C08K 7/00 | 520/1 |
| 8,859,059 B2 * | 10/2014 | Naaman | B81C 1/00031 | 427/598 |
| 9,011,752 B2 * | 4/2015 | Seppala | H01P 3/08 | 264/437 |
| 9,312,046 B2 * | 4/2016 | Hong | C08K 3/04 | |
| 2004/0052976 A1 * | 3/2004 | Buczek | B05D 1/40 | 427/598 |
| 2005/0239948 A1 * | 10/2005 | Haik | B29C 67/24 | 524/496 |
| 2007/0116627 A1 * | 5/2007 | Collier | B82Y 10/00 | 423/447.2 |
| 2010/0098902 A1 * | 4/2010 | Kotov | B05D 7/54 | 428/105 |
| 2011/0204020 A1 * | 8/2011 | Ray | B82Y 25/00 | 216/13 |
| 2013/0171437 A1 * | 7/2013 | Xiong | C08J 5/10 | 428/220 |
| 2013/0264511 A1 * | 10/2013 | Choi | H05K 9/0083 | 252/62.54 |

* cited by examiner

METHOD FOR ALIGNING HIGH ASPECT RATIO MATERIALS AND COMPOSITIONS THEREFROM

CROSS REFERENCE TO RELATED APPLICATION

The present invention claims priority from pending U.S. Provisional Patent Application Ser. No. 61/880,503, filed Sep. 20, 2013, entitled "Method for Aligning High Aspect Ratio Materials," the subject matter of which is incorporated by reference herein in its entirety.

SPONSORSHIP STATEMENT

This application has been sponsored by the Iranian Nanotechnology Initiative Council, which does not have any rights in this application.

TECHNICAL FIELD

This invention generally relates to a method for alignment of high aspect ratio materials in liquid matrices by means of magnetic particles and application of an external magnetic field, and compositions made thereby.

BACKGROUND OF THE INVENTION

Materials with high ratios of length-to-diameter, also referred to as high aspect ratio materials (HARMs), constitute an extensive group. Examples within this classification of materials include carbon nanotubes (CNTs), chopped carbon fibers, nanofibers, nanorods, nanobelts, nanowires, etc. The alignment of HARMs is of intensive importance for many applications, such as the synthesis of reinforced composites and high-quality electrical devices. The main goals of the alignment procedure are to exclude the anisotropic characteristics of the HARMs and improve their mechanical, electrical and thermal properties, as well as composites thereof, in one special direction.

Detailed literature review indicates that most of the existing alignment methods have limitations, e.g., they are subject to poor alignment, specific matrix materials, or small-scale matrices. The application of electric fields has been studied to align a number of HARMs in a matrix between two electrodes. However, the operational drawbacks to this technique include, but are not limited to, high field strengths (e.g., about 1000 V/cm) and frequencies (e.g., 10-100 MHz). Therefore, these latter approaches are costly and restricted from widespread application.

Magnetic fields are also used for aligning a number of HARMs along the field lines. Although this method can properly orientate the HARMs, the technique demands strong fields (15-25 Tesla) for almost all HARMs due to their poor magnetic susceptibility, which increases the costs and causes the method to become infeasible for industrial applications.

Several efforts have been made for the attachment of magnetic particles to the HARMs in order to enhance their magnetic attraction. It is possible to attach magnetic nanoparticles to the surface of carbon nanotubes (CNTs) to elevate the above-mentioned susceptibility and hence align the HARMs by low-strength magnetic fields. A major disadvantage of this method relates to the residual of the applied magnetic nanoparticles in the final product, which imposes some undesirable properties, such as the materials being overweight (e.g., 100 to 200 times higher than the weight of the pristine HARMs). Moreover, an appropriate attachment of the magnetic nanoparticles depends upon the superficial chemical characteristics of the HARMs, which is not always possible.

Another recent method for alignment of CNTs under the influence of low magnetic fields involves the adsorption of magnetic nanoparticles onto the surfaces of the CNTs due to the use of surface-active agents or surfactants. The electrostatic attraction caused by the so applied surfactants forces the magnetic nanoparticles to aggregate upon the surface of the CNTs and consequently increase their magnetic susceptibility. The final product of this method, however, suffers from the aforementioned problem of high density, as well as other unwanted properties due to the magnetic particles. In general, both the physical and the chemical attachment processes entail either expensive, time-consuming or destructive procedures.

In other research, an attempt to increase the magnetic susceptibility of CNTs was made by loading them with paramagnetic iron oxide nanoparticles. As is understood in the art, to embed the magnetic nanoparticles, CNTs must have open ends. Generally, opening the ends of CNTs causes the destruction of the graphitic structure of CNTs, which, in turn, results in the reduction of the mechanical properties of CNTs. Also, this approach is limited only to nanomaterials possessing tubular/void configurations in order for loading the magnetic nanoparticles.

In conclusion, the current, existing alignment methods, based upon the application of magnetic fields, could be divided into two categories. In the first one, strong magnetic fields are employed to achieve the desired alignment, which ultimately makes it infeasible from an economic point of view for industrial applications. The second category pertains to methods which involve the use of the magnetic particles to compensate the need for magnetic fields of high strengths. These methods, however, are not able to effectively remove the added magnetic particles after the alignment process, and, consequently impose unfavorable properties onto the ultimate product.

It is, therefore an object of the present invention to provide an improved approach in the methodology for aligning HARMs, and improve the quality of the HARMs so produced.

SUMMARY OF THE INVENTION

The present invention provides a method for aligning high-aspect-ratio materials (HARMs), such as carbon nanotubes (CNTs), chopped carbon fibers, nanofibers, nanorods, nanobelts and nanowires by creating a drag force on the HARMs through the ordered drift of an amount of magnetic particles due to application of an external magnetic field within a liquid matrix. Once a desirable alignment is achieved, the accumulated magnetic particles can be removed off the matrix either by cutting one end of the solidified matrix, in a so-called incision process, or by absorbing the particles through immersing another external magnet, in an extraction process.

In one embodiment of the present invention, the magnetic field can be fixed at one side of the mixture, which offers an easier operation, while requiring higher field strengths. In another embodiment, the magnetic field can be applied in a mobile magnetic field mode, which involves slowly crossing over two magnets, touching the top and bottom of the matrix.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying DRAWINGS, where like reference numerals designate like structural and other elements, in which:

DETAILED DESCRIPTION OF THE INVENTION

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

It should be understood to one of skill in the art that the innovation described herein is related to the synthesis of a nano-hybrid catalyst for selective catalytic reduction (SCR) of NO from stationary sources.

The present invention provides a method to align high-aspect-ratio materials (HARMs) by forced movement of magnetic particles within a mixture. Initially, the HARMs and the magnetic particles are thoroughly and substantially uniformly dispersed in a matrix to achieve a homogeneous mixture. Afterwards, a magnetic field is applied to one side of the mixture to attract the magnetic particles, which start to move in a laminar fashion and uni-directionally along the lines of the magnetic field within the mixture. This movement of the magnetic particles, however, creates a drag force in the mixture, which results in the alignment of the HARMs parallel to the direction of particle movement. The magnetic particles continue to move until they eventually accumulate at the side of the mixture where the magnetic field was applied, thereby generally separating them.

Figure 1:
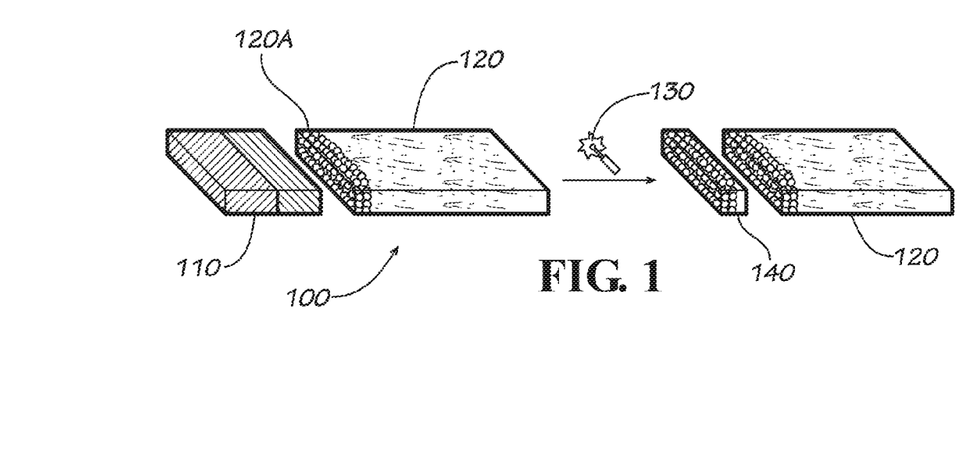
FIG. 1 is a schematic illustration of the incision process employed in practicing the present invention, showing an accumulation of the magnetic particles in a small region of the sample material admixture of HARMS and magnetic particles, and cutting a marginal section of the admixture in which the magnetic particles are deposited.

These accumulated particles can be easily separated from the mixture by two preferred ways. The first, known as the incision process, involves cutting the margin of the mixture where the particles are accumulated. With reference now to FIG. 1 of the DRAWINGS, there is shown the aforesaid incision process, generally designated by the reference numeral 100. As noted, a mixture including magnetic particles therein is influenced by a magnet, generally designated by the reference numeral 110, applied to one side of the material, generally designated by the reference numeral 120, particularly the left side shown in FIG. 1, generally designated by the reference identifier 120A. As evidenced by the name, the incision process employs a cutter or knife, generally designated by the reference numeral 130, which is used to cut off the end of the material 120 at the one side 120A thereof, resulting in a piece of removed material, generally designated by the reference numeral 140, containing the aforementioned magnetic particles that were admixed with the mixture material 120.

It should be understood that the incision method is preferable for the matrices that tend to solidify after the alignment. Accordingly, only a small portion 140 of the mixture 120 may need to be removed, which based on conducted experiments is about one-twentieth of the sample length.

In a second method, referred to as the extraction process, the magnetic particles are removed by immersing or applying a second magnet generally orthogonally to the region where the particles are accumulated in order to extract them out.

Figure 2:
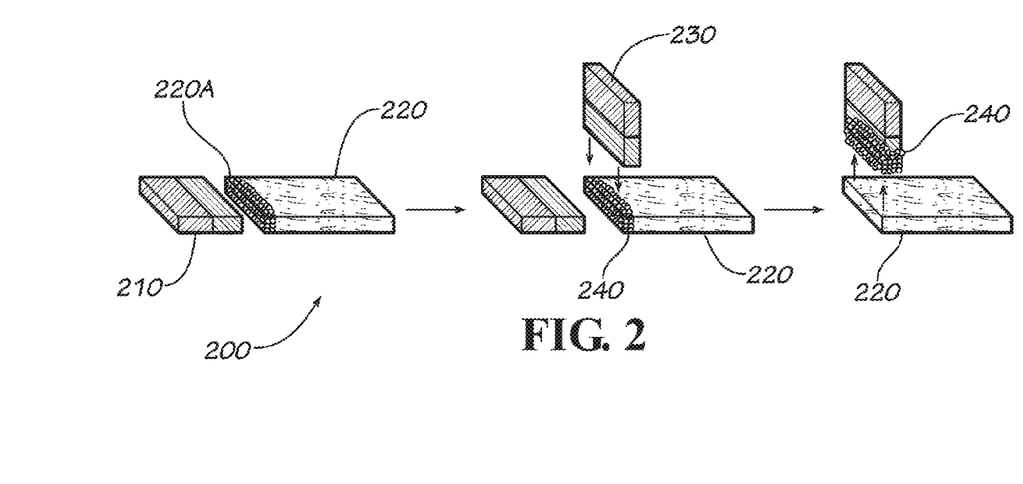
FIG. 2 is a schematic layout of the extraction process employed in practicing the present invention, also showing an accumulation of magnetic particles in a small region of the sample material admixture, the insertion or immersion of another magnet, a simple magnet, into the admixture margin, and then pulling the magnet and the collected magnetic particles out of the admixture.

With reference now to FIG. 2 of the DRAWINGS, there is illustrated the aforesaid extraction process, generally designated by the reference numeral 200. As with the incision process described hereinabove, an admixture including magnetic particles therein is influenced by a magnet, generally designated by the reference numeral 210, applied to one side of a material, generally designated by the reference numeral 220, particularly the left side, as shown in FIG. 2 and generally designated by the reference identifier 220A. Instead of cutting, as in the aforesaid incision process, the extraction process 300 employs a second magnet, generally designated by the reference numeral 230, which is applied generally orthogonally to the end 220A of the material 220, being immersed or inserted into the melted or softened material 220 at the end 220A thereof. The so-applied magnet 230 draws off the magnetic particles within the material 220 to the end area 220A, resulting in the magnetic removal of the magnetic particles, generally designated by the reference numeral 240, from the mixture material 220.

The magnetic particles 240 are attracted to and held by magnet 230 and removed from the mixture 220 easily. As above, this separation is employed along only a small portion of the mixture so to not damage the above-mentioned alignment of the HARMs.

Applicant has discovered that the aforementioned alignment methods and techniques are able to align all one-dimensional materials with length-to-diameter ratios higher than ten, based on their special geometry, and regardless of their physical and chemical properties. Also, according to the high magnetic susceptibility of the magnetic particles, these alignment operations can be carried out by relatively low level magnetic fields to remove virtually all of the embedded magnetic particles. Indeed, one of the most significant advantages of these methods is the elimination of magnetic particles from the material, and thus not imposing undesirable properties onto the final product because of residual magnetic particles.

The HARMs

It should be understood that the methodology of the present invention is applicable for alignment of various types of HARMs, such as CNTs, chopped carbon fibers, nanofibers, nanorods, nanobelts and nanowires. It should also be understood that HARMs can be referred to the materials with length-to-diameter ratios greater than four (preferably greater than ten). It should be noted that the HARMs preferably do not possess magnetic susceptibility; otherwise, they would be absorbed by the aforesaid magnetic field and accumulate on one side of the mixture.

Magnetic Particles

Magnetic particles that can be employed in the present invention include a wide span of the magnetic, paramagnetic, ferrimagnetic, ferromagnetic, diamagnetic and superparamagnetic materials, as is understood in the art. These particles may be comprised of iron, nickel, cobalt and their alloys. The size of the utilized magnetic particles is preferably comparable to the dimensions of the HARMs. Intense stirring of the mixture with the admixed magnetic particles is required to avoid agglomeration of the magnetic particles. It is noteworthy that the magnetic particles and the HARMs preferably do not attract each other, so as to prevent the movement and accumulation of the HARMs with magnetic particles (entrainment). Intense stirring, low contact time, use of relatively large magnetic particles, as well as the lack of any physical or chemical affinity between the HARMs and the magnetic particles, are favorable in this regard. It should be understood that one of skill in the art can determine the required concentrations of the magnetic particles according to the volume of the matrix and the concentration of the HARMs. Furthermore, the magnetic particles should be concentrated sufficiently to provide a widespread and one-directional flow across the mixture by the movement of the magnetic particles therethrough along magnetic field lines.

The Magnetic Field

The present invention requires a minimum field strength, which is able to absorb all the magnetic particles and direct them toward one side of the mixture, at which the magnetic field is applied. On the other hand, the magnetic field should not be so strong to cause intense absorption of the magnetic particles, which in turn results in turbulence and disruption to the alignment process. The magnetic field can be induced by simple magnets or other equipment, such as solenoids, described further hereinbelow.

As discussed, in one embodiment of the present invention, the magnetic field can be fixed at one side of the mixture. In another embodiment, the magnetic field can be applied in a mobile mode, also described in more detail hereinbelow. It should be understood that fixed magnetic fields should be located on one side of the mixture and be capable of absorbing magnetic particles from all points of the mixture. Employment of a fixed magnetic field offers an easier operation procedure than the mobile one. However, fixed fields demand higher field strengths than the mobile mode due to the greater distance of some mixture regions from the magnet.

Figure 3:
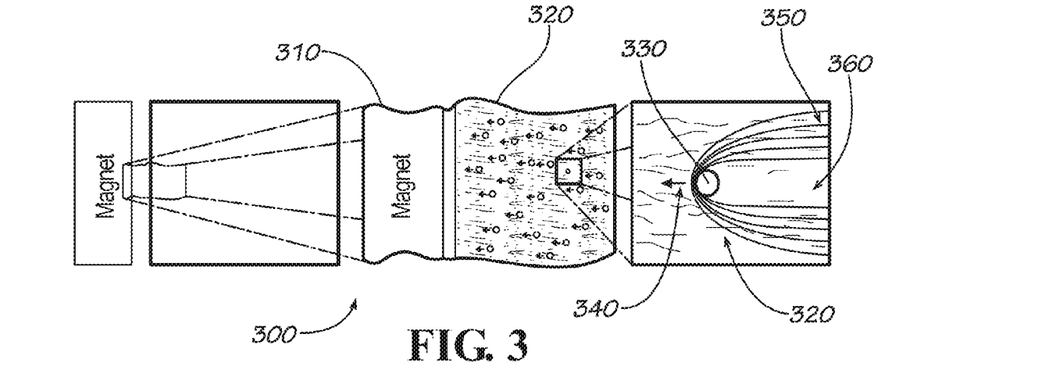
FIG. 3 schematically illustrates applying a fixed magnetic field to an admixture material by a simple magnet, with uniform, one-directional and non-turbulent motion of magnetic particles moving within the admixture under the influence of the magnetic field, and the alignment of the HARMs along the flow lines by the drag force due to the magnetic particle movement.

With reference to FIG. 3 of the DRAWINGS, there is illustrated therein a schematic representation of the application of a fixed magnetic field to a material admixed with substantially and uniformly distributed magnetic particles therethrough, the process generally designated by the reference numeral 300. As illustrated, an admixture materials is influenced by a magnet, generally designated by the reference numeral 310, preferably a simple magnet, applied at one end of the aforesaid admixture material, generally designated by the reference numeral 320, thereby pulling the admixed magnetic particles, generally designated by the reference numeral 330, in the direction of the magnet 310, as shown by an arrow, generally designated by the reference numeral 340, where the right-hand illustration is an expanded view of one magnetic particle 330 within the material 320 and moving therethrough, where the material 320 is soft, melted or otherwise sufficiently pliable for the aforesaid magnetic particles suspended therein to traverse therethrough, driven by the magnetic field. As shown, the magnet 310 has sufficient strength in this fixed magnetic field configuration to cover the entire cross-section of the mixture material 320, thereby better guaranteeing uniform and one-directional absorption of all of the magnetic particles 330 dispersed within the admixture material 320.

As shown in FIG. 3, the magnetic particles 330 traversing through the material 320 under the influence of the fixed magnetic field create flow lines, generally designated by the reference numeral 350, in their wake, and a matrix or void, generally designated by the reference numeral 360, thereby creating a HARM.

In an alternate embodiment mobile mode configuration, the magnetic field is applied by crossing two magnets from top and bottom of the mixture container. The magnetic particles start to move slowly along the mixture parallel to the magnets movement.

Figure 4:
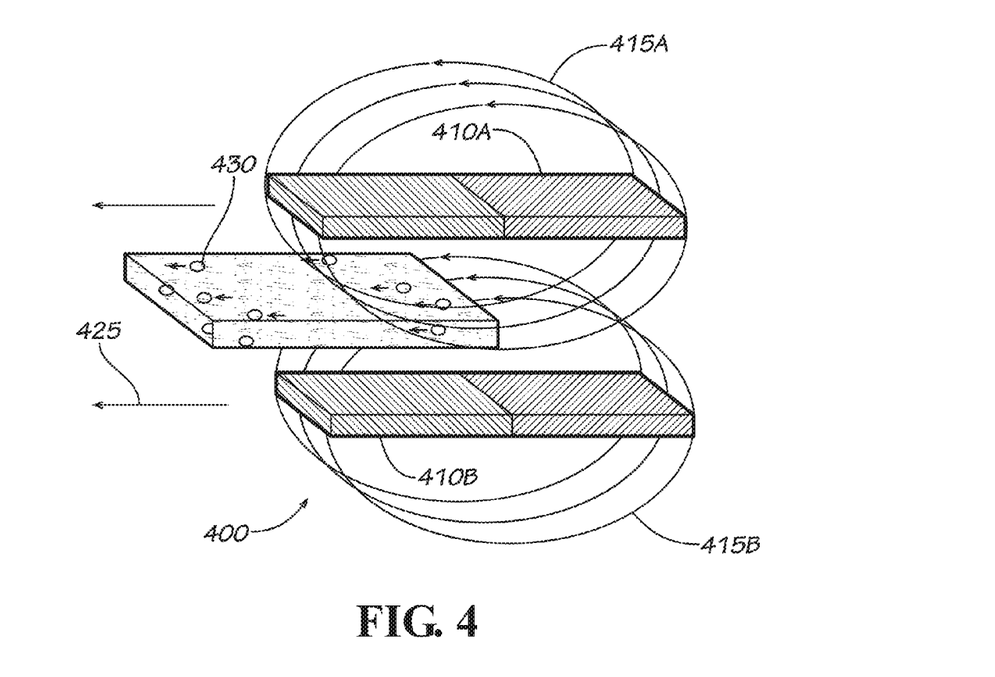
FIG. 4 is a representative illustration of applying a magnetic field to the mixture using two simple magnets in a mobile mode.

With reference now to FIG. 4 of the DRAWINGS, there is illustrated the aforementioned mobile mode configuration of the present invention, generally designated by the reference numeral 400, which applies a magnetic field to the admixture containing magnetic particles and the HARMs by two simple magnets in this mode.

As shown in FIG. 4, a pair of magnets, generally designated by the reference identifiers, 410A and 410B, respectively, are disposed above and below (or on opposite sides) a material, generally designated by the reference numeral 420, with the intersecting and reinforcing field lines of the magnets 410A and 410B, generally designated by the reference identifiers 415A and 415B, respectively, passing over the mixture 420 substantially simultaneously, thereby forcing a one-directional movement of magnetic particles, generally designated by the reference numeral 430, along and through the mixture 420 in the direction indicated by an arrow, generally designated by the reference numeral 425.

It should be understood that magnets 410A and 410B are preferably similar and move at the same distance from the mixture material 420 in order to put the resultant force of the two magnetic fields 415A and 415B in the same direction. To ensure a complete removal of the magnetic particles 330, the magnets 410A and 410B can be moved several times throughout the admixture material 420 in the same direction.

It should be understood that moving the magnets too slowly in this process may lead to the accumulation of magnetic particles 430 in upper and lower surfaces of the admixture material 420. On the other hand, moving the magnets at a higher speed of may cause incomplete collection of the magnetic particles 430 from the admixture. Furthermore, the magnetic particles so driven to the ends of the material 420 may be removed by the aforementioned incision, extraction or other process. The presented method could be easily scaled up, providing desirable features for industrial applications.

Figure 5:
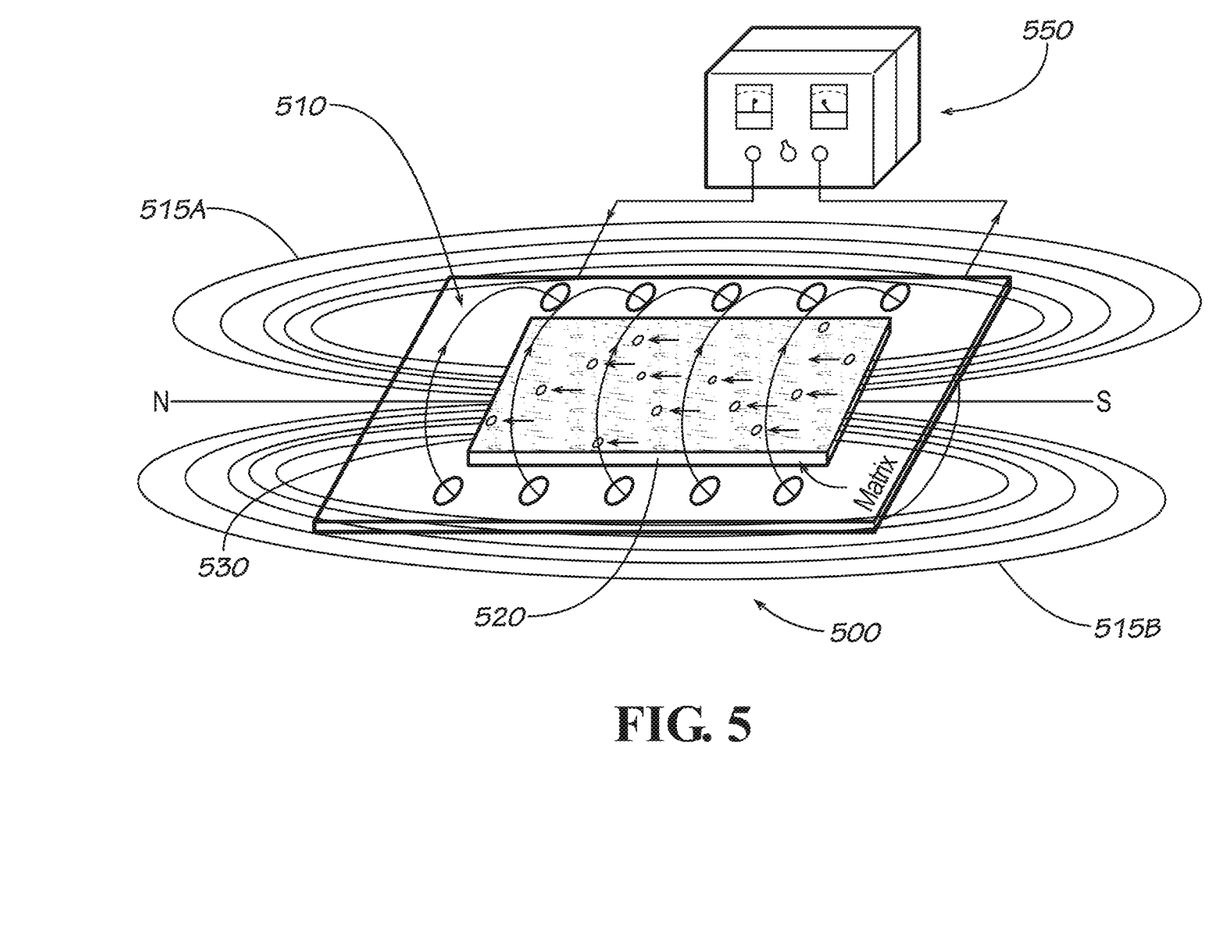
FIG. 5 is a representative illustration of applying a magnetic field to the admixture using a solenoid in a stationary mode.

With reference now to FIG. 5 of the DRAWINGS, there is illustrated an alternate embodiment of the present invention, generally designated by the reference numeral 500, where a magnetic field is applied to the admixture material containing magnetic particles and the HARMs using a solenoid, generally designated by the reference numeral 510, in a stationary mode. As is shown, the admixture material, generally designated by the reference numeral 520, with magnetic particles, generally designated by the reference numeral 530, is placed entirely within the solenoid 510 in the stationary fashion or mode to enable parallel magnetic field lines along the material, generally designated by the reference identifiers 515A and 515B, respectively. A power source, generally designated by the reference numeral 550, is also shown. Obviously, the solenoid 510 can also be applied in a mobile mode, such as described and illustrated hereinabove in connection with FIG. 4, by moving along the admixture material similar to what was described with the employment of the simple magnets 410A and 410B.

It should be understood that the required operational magnetic field strength to implement the instant invention depends on various parameters, such as the matrix volume, matrix viscosity and the magnetic susceptibility of the magnetic particles, where a stronger magnetic field is required for a higher matrix volume, higher matrix viscosity and lower susceptibility of magnetic particles.

Matrix Material

Various materials, including polymers, solutions, gels, molten glasses, metals, alloys and other similar materials, can be used as the matrix. However, these materials should not have magnetic susceptibility; otherwise, the magnetized matrices may accumulate along a margin of a container at which the magnetic field is applied, and the aforesaid alignment procedure would be disrupted.

In an effort to illustrate the principles of the present invention, some of the experimental data gathered is discussed hereinbelow. It should, of course, be understood that whereas these examples are exemplary of the scope of the instant invention, the scope is defined by the claims hereinbelow.

EXAMPLE 1

The alignment of CNTs (HARMs) was investigated in epoxy resin (matrix) to enhance the mechanical and electrical properties of the reinforced composites. Pristine multi-walled CNTs (MWCNTs) synthesized by a chemical vapor deposition process (diameter<30 nm, length of 5-15 μm and purity>95%) were purchased from Shenzhen Nano-Tech Port Co. Commercially available epoxy resin (EPL 219) and its curing agent (EPH 5161) were purchased from Ghafari Co. in Iran. This epoxy resin should be mixed with its curing agent at the ratio of 2:1 and then cured at room temperature. All chemicals were of analytical grade.

MWCNTs (15 mg) were initially dispersed in 10 g epoxy resin by an ultrasonic bath for about 4 hours. Then, iron oxide particles (15 mg $Fe_3O_4$, particles size ~5 μm) were added to the mixture and mixed thoroughly in a shaker for 10 minutes to achieve a homogeneous suspension of MWCNTs and the magnetic particles in the epoxy resin. The magnetic particles were not absorbed to the surface of MWCNTs due to their large size (micron-scale) and severe agitation of the mixture. A curing agent (5 g) was also added and mixed for another 10 minutes, and then molded (standard silicone mold). The magnetic field was applied quickly to the admixture, to avoid agglomeration of the magnetic particles. A simple magnet (0.2 Tesla) was used in the stationary mode, and then the admixture was allowed to rest for 48 hours at room temperature. The magnetic particles were then separated by the aforesaid incision process (where the separated part was less than one-twentieth of the sample length), as set forth hereinabove in connection with FIG. 1. Neat epoxy composites and ordinary MWCNTs-epoxy composites, without the alignment procedure, were also prepared for comparison.

Morphology of the Reinforced Composites

The morphology of the composites, reinforced with 0.1 wt % of MWCNTs, was studied using a scanning electron microscope (SEM) (Model: 5360, Oxford, Co.). Other related research works performed have similar magnifications to investigate the morphology. To avoid charging during the electron irradiation, the samples were covered with ~5 nm over-layer of an Au—Pd alloy in an evaporator (Model: E5200C).

Figure 6:
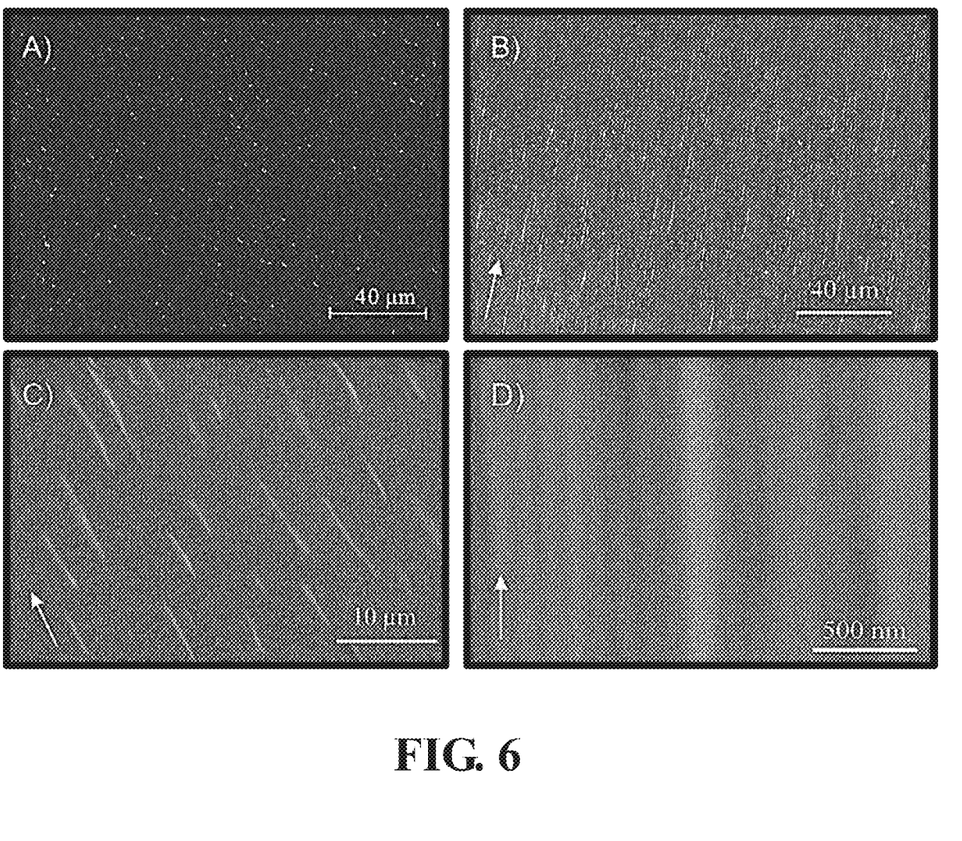
FIG. 6 illustrates top surface images of various reinforced composites made pursuant to the teachings of the present invention, including an ordinary MWCNTs-epoxy shown in FIG. 6A, and in FIGS. 6B-D aligned Multi-Walled Carbon Nanotubes (MWCNTs)-epoxy composites with different magnifications.

Turning again to the DRAWINGS, FIG. 6 illustrates top surface images of the ordinary reinforced composition, shown in FIG. 6A, and the aligned reinforced composites at different magnifications, i.e., 40 μm in FIG. 6B, 10 μm in FIG. 6C, and 500 nm in FIG. 6D.

Typical behavior of MWCNTs in the epoxy composite after this alignment procedure is shown in FIGS. 6B to 6D. Evidences of orientation and alignment of MWCNTs in the direction of the movement of the magnetic particles can be easily observed. Considering the image scale and the MWCNTs diameters, the streaks appearing in FIG. 6D cannot be individual MWCNTs, but are actually "chains and clusters" of the MWCNTs that are intertwined together, reaching a diameter of about 100 nm. These MWCNT chains and clusters were previously observed in other alignment procedures. It is noteworthy that contact of graphitic walls of the MWCNTs could lead to strong van der Waals attractive forces between them and form the observed skeins.

Figure 7:
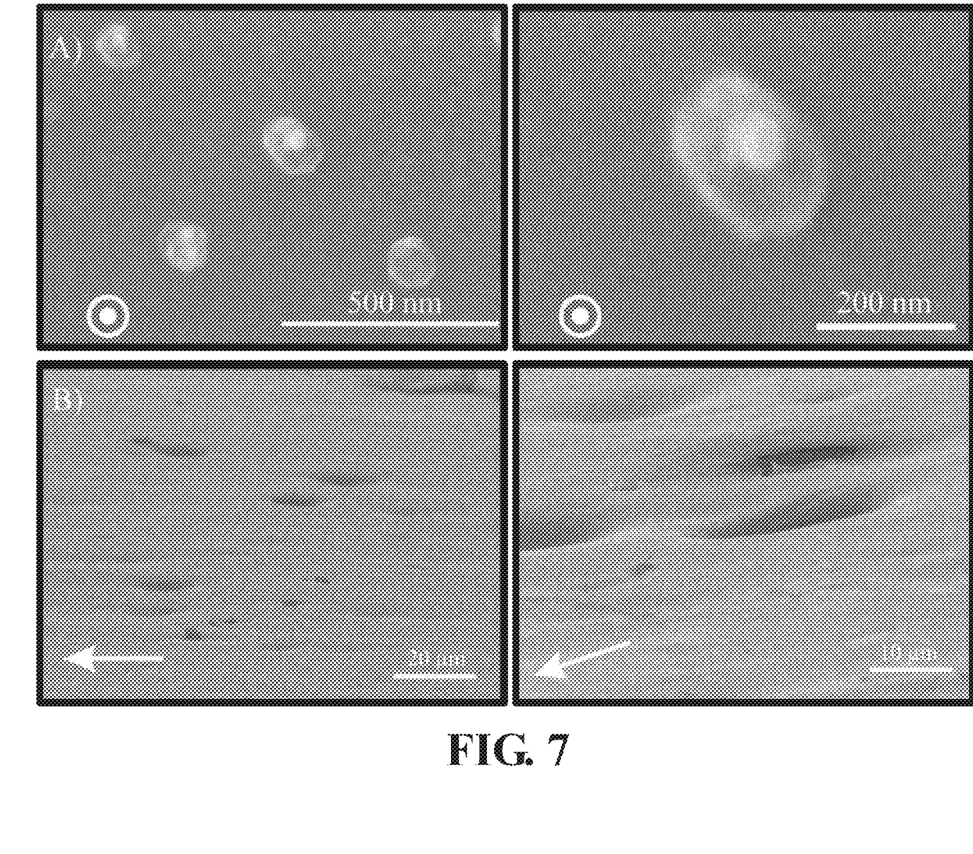
FIG. 7 depicts cross-sections of the composites of FIG. 6 at two different magnifications: perpendicular, as shown in FIG. 7A at two magnifications, and parallel to the direction of the magnetic particles movement, as shown in FIG. 7B at two magnifications, where arrows and bullets show the direction of movement of the magnetic particles through the admixture material.

To obtain images from different cross-sections of the samples, they were broken in liquid nitrogen. With reference now to FIG. 7 of the DRAWINGS, there is illustrated various composite cross-sections, e.g., perpendicularly in FIG. 7A, at 500 nm and 200 nm, respectively, and parallel to the direction of the magnetic particles movement at different magnifications, e.g., in FIG. 7B, at 20 μm and 10 μm, respectively. In both of the cross-sections, there is evidence of the alignment of MWCNTs in the direction of magnetic particles movement, demonstrating the ability of this method in alignment of the HARMs in the liquid mixture and also in the final composite.

Mechanical Properties

Figure 8:
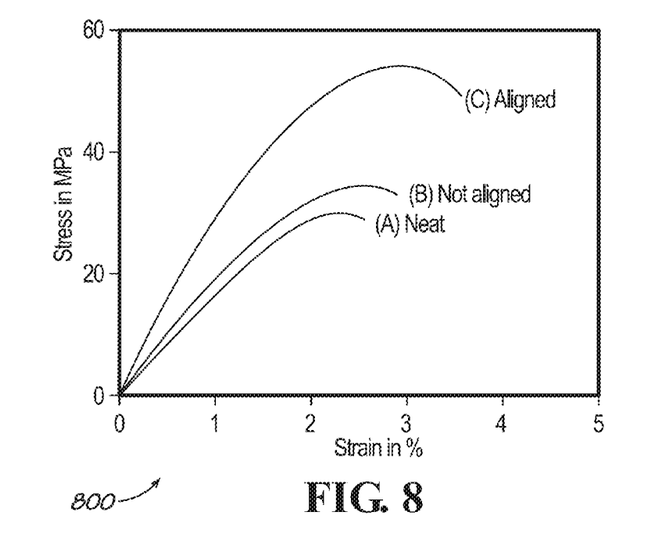
FIG. 8 is a chart illustrating stress-strain curves of neat epoxy, designated by the curve A, not-aligned, designated by the curve B, and aligned MWCNTs-epoxy composites, designated by the curve C.

The stress-strain curves of prepared samples were investigated to evaluate the effect of MWCNTs addition and the alignment procedure of these reinforcements on mechanical properties of epoxy composites. With reference now to FIG. 8, there are illustrated some physical properties of the composites produced employing the principles of the present invention, generally represented by the chart with the reference numeral designation 800.

As shown in FIG. 8, E-modulus and tensile strength of the epoxy composite increased about 6 and 24 percent, respectively, with the addition of MWCNTs, with reference to Table 1 hereinbelow. However, the alignment procedure (and advantages thereof) approximately quadrupled with the same amount of MWCNTs. The measured tensile strength of the ordinary sample was 34.84 MPa, which was increased by about 54% after alignment of the MWCNTs. The E-modulus calculated from the stress-strain curve also shows an increment about 48% after the alignment procedure.

TABLE 1

| Sample | E-Modulus (GPa) | Tensile strength (MPa) | Conductivity (S/cm) |
|---|---|---|---|
| Neat epoxy | 2.04 | 28.21 | $1.7 \times 10^{-12}$ |
| Not-aligned MWCNTs | 2.16 | 34.84 | $2.65 \times 10^{-12}$ |
| Aligned MWCNTs | 3.19 | 53.87 | $3.74 \times 10^{-12}$ |

Electrical Properties

DC volume conductivity measurements were conducted to study the effect of the alignment procedure on conductivity of the prepared composites. A constant voltage was applied by a DC power supply and monitored with a digital multimeter. Contact resistance was reduced by covering the electrodes with a conducting silver epoxy. While neat epoxy is an electrical insulator, an increase in conductivity was observed with the addition of MWCNTs as a highly conductive filler, as shown in TABLE 1 hereinabove. As shown, the conductance of the aligned sample was increased about 41% in comparison to the ordinary case, suggesting good alignment of MWCNTs in the epoxy composite, especially due to very low concentration of these nanofillers (0.1 wt %). Considerable increase of conductivity may be expected for higher percentages of MWCNTs due to formation of larger chains and clusters along the mixture.

Reproducibility of the Results by the Invented Method

Three samples were prepared with exactly similar conditions to test the repeatability of this method. To be able to draw conclusions, another three samples were similarly prepared with the exception that they were reinforced by 0.5 wt % MWCNTs. TABLE 2 below shows the mechanical and electrical properties of these samples, which were measured by the previously mentioned methods. As can be seen, the variation of both mechanical and electrical properties is less than 10% in both MWCNT concentrations, indicating the acceptable repeatability of this alignment procedure.

TABLE 2

| MW CNT wt % | Tensile strength (MPa) | | | | Conductivity (S/cm) | | | |
|---|---|---|---|---|---|---|---|---|
| | Sample 1 | Sample 2 | Sample 3 | Variations | Sample 1 | Sample 2 | Sample 3 | Variations |
| 0.1 | 53.87 | 57.26 | 56.03 | ±1.85 | $3.74 \times 10^{-12}$ | $3.97 \times 10^{-12}$ | $3.87 \times 10^{-12}$ | $±0.12 \times 10^{-12}$ |
| 0.5 | 69.73 | 64.87 | 72.27 | ±4.08 | $4.54 \times 10^{-12}$ | $4.38 \times 10^{-12}$ | $4.81 \times 10^{-12}$ | $±0.23 \times 10^{-12}$ |

Controllability

Field strength and magnetic particles concentration were also studied, as two main parameters of the alignment quality, to control and enhance the alignment procedure. Three different magnets (0.1, 0.2 and 0.5 Tesla, respectively) were separately applied to similar mixtures to investigate the effect of field strength on the alignment quality. TABLE 3 hereinbelow shows the mechanical and electrical properties of the epoxy composites, which were treated with different magnet strengths in a stationary mode. Both of the examined mechanical properties show an increase by increasing the field strength from 0.1 to 0.2 T, which can be attributed to the stronger absorption of the magnetic particles and consequently the production of a greater shear stress in the mixture, leading to a better alignment of the MWCNTs. However, as shown in Table 3, an excessive field strength (0.5 Tesla) caused a relatively sharp reduction of both the mechanical and the electrical properties. These reductions could be due to severe turbulence (vortex creation), resulting from sudden and intense movement of the magnetic particles in the mixture, and the resulting disruption of the laminar flow lines and discontinuation of the alignment procedure.

TABLE 3

| Field strength (Tesla) | Tensile strength (MPa) | Conductivity (S/cm) |
|---|---|---|
| 0.1 | 52.34 | $3.22 \times 10^{-12}$ |
| 0.2 | 53.87 | $3.74 \times 10^{-12}$ |
| 0.5 | 49.21 | $2.89 \times 10^{-12}$ |

The concentration of the magnetic particles was also investigated as another significant parameter of the alignment operation, as shown in TABLE 4 hereinbelow. As illustrated, the results indicate that an increase in particle concentration led to an enhancement in both the mechanical and the electrical properties, which can be attributed to the greater drag force imposed on MWCNTs in the admixture and thus their uniform alignment. Similar to the aforesaid previous trend, it is expected that excessive concentration of magnetic particles may deteriorate the alignment procedure.

TABLE 4

| Particle concentration | Tensile strength (MPa) | Conductivity (S/cm) |
|---|---|---|
| 0.1 wt % | 51.27 | $3.08 \times 10^{-12}$ |
| 0.3 wt % | 53.87 | $3.74 \times 10^{-12}$ |

According to obtained results from the above two parameters, it can be expected that alignment quality can similarly be controlled by different operational parameters. Generally, these parameters can include the type and the concentration of the HARMs, the strength and the mode of applying magnetic field, the matrix viscosity, the type, size, magnetic susceptibility and the concentration of the magnetic particles.

Magnetic Particles Movements and Accumulation

Figure 9:
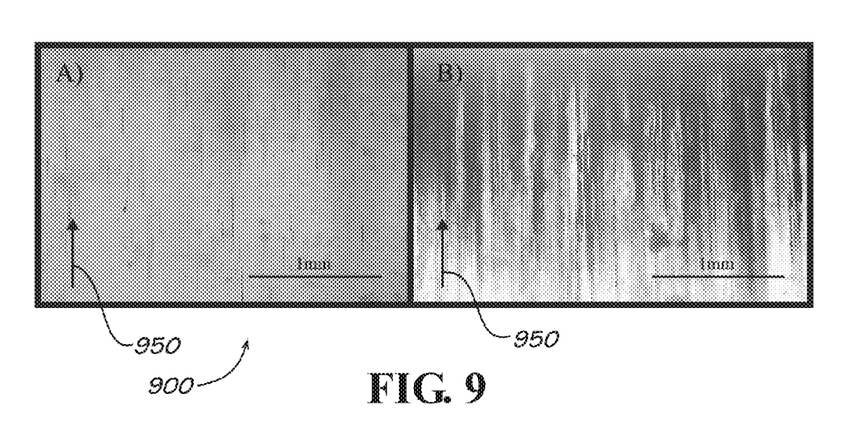
FIG. 9 illustrates movement of the magnetic streaks in the admixture, as shown in FIG. 9A, and the accumulation of the magnetic particles along one side of the mixture container, as shown by FIG. 9B, where in an effort to achieve a better observation of streaks, this sample was prepared without MWCNTs.

Movements and accumulation of the magnetic particles in the mixture exposed to the magnetic field is another striking point that shall be discussed. The magnetic particles start to move along the magnetic field lines and form one-dimensional streaks. With reference now to FIG. 9 of the DRAWINGS, the movements of the magnetic particles in the mixture material, forming streaks therethrough, is illustrated, generally designated by the reference numeral 900. These movements were captured by an optical microscope (Model: BM-108N-SAIRAN), with the formation of these moving streaks along the admixture. As can be seen, these streaks are formed along the magnetic field lines, illustrated by an arrow, generally designated by the reference numeral 950, and provide required the drag force to align MWCNTs in the mixture. Formation of these streaks is due to strong tendency of the magnetic particles (here Fe3O4) to agglomerate. As also shown in FIG. 9A, these tiny one-dimensional streaks typically have diameters and lengths in micrometer and millimeter scales, respectively.

With reference now to FIG. 9B, this illustrates the margin of the admixture material where the magnetic field was applied and the magnetic particles are accumulated. This Figure confirms the accumulation of the particles in a small region of the mixture (approximately one-twentieth of container length). Therefore, separation of these particles by another magnet (or incision) in this small region would not disrupt the alignment procedure.

The possibility of complete exclusion of the magnetic particles after accumulation in the margin of mixture is studied to ensure removal of the undesired magnetic particles in the final product. For example, SEM images taken from the top surface (FIG. 6) and different cross-sections (FIG. 7) of the samples did not reveal any traces of these particles in the remaining material. There are also two other ways to ensure the complete removal of the magnetic particles from a final product. One is to weigh the magnetic particles sticking to the magnet immersed into the mixture and comparing it to its initial weight. The collected magnetic particles were first washed with acetone to remove residues from the resin. Then, they were dispersed in water by an ultrasonic bath for 15 minutes and collected by simple magnet from the mixture to remove possible residual MWCNTs. The collected particles were nearly 95% of initial value (0.474 g of 0.5 g), indicating the proper removal of magnetic particles. This method can be especially useful for samples prepared by the aforesaid extraction processes.

The second method can be used for samples prepared by both the incision as well as the extraction processes. In this method, the sample was completely burned in a crucible and the remaining ashes were then refluxed in a mixture of hydrochloric acid and potassium thiocyanate. Iron (III)-thiocyanate complex change the color of the solution into reddish brown. The color change of the solution was examined by UV-visible (Model: avantes-LS-1101014), and the amount of residual iron oxide in the sample was determined by its peak intensity. Calibration curves were provided based on iron-peak intensity (in the range of 474 to 479 nm) from three stock standard solutions with different iron concentrations (1, 4 and 8 ppm).

Figure 10:
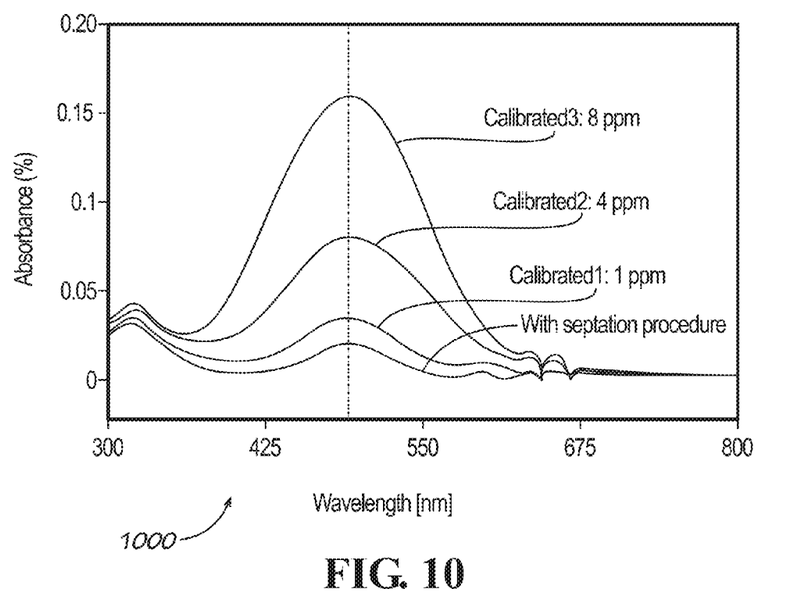
FIG. 10 is a chart illustrating the UV-visible absorbance spectra of an iron complex solution extracted from burned MWCNT composites, aligned by movement of Fe3O4 particles and three stock standard solutions.

With reference now to FIG. 10 of the DRAWINGS, there is illustrated an ultraviolet (UV) visible absorption spectra of an iron complex solution employed in the present invention, indicating that the residual iron oxide in the aligned reinforced composite is less than 1 ppm. These results are consistent with the previous examination that magnetic particles have been almost completely removed from the final product.

EXAMPLE 2

In this second experimental example, a study is made of the effect of the HARMs orientation on the mechanical and electrical properties, the alignment of chopped carbon fibers (CCFs), as HARMs, carried out in polyester (matrix). CCFs (30 mg, diameter<10 μm, length<1 mm) were completely dispersed in polyester (15 g, Model: NRC 200) by an ultrasonic bath for 4 hours. Then, iron oxide particles (15 mg Fe3O4, particles size<0.5 mm) were added to the mixture and mixed thoroughly using a shaker for 10 minutes to achieve a homogeneous suspension. Curing agents (1.5 cc Arsenic acid and 0.15 cc Cobalt) were added and mixed for 5 min and then molded. A magnetic field (0.2 Tesla) was applied quickly to the mixture in the mobile mode by two simple magnets. The mixture was allowed to set for 72 hours at room temperature in a silicone mold. The magnetic particles were separated trough the extraction method by another magnet (0.1 Tesla). The ordinary sample, which did not undergo any alignment processes, and neat polyester were also prepared for the sake of comparison. TABLE 5 hereinbelow presents the mechanical and electrical properties of the neat polyester, the ordinarily reinforced and the aligned reinforced samples. The polyester reinforced with 0.2 wt % CCFs caused almost a minor increase in both E-Modulus (2% increase) and tensile strength (8% increase). However, the alignment procedure increases E-modulus and tensile strength of the reinforced polyester more than 12% and 20%, respectively. The electrical conductivity also followed an increase about 25% and 56% by adding chopped fiber to polyester in ordinary and aligned state, respectively.

TABLE 5

| Sample | E-Modulus (GPa) | Tensile strength (MPa) | Conductivity (S/cm) |
| --- | --- | --- | --- |
| Neat polyester | 1.31 | 27.21 | $3.6 \times 10^{-11}$ |
| Not-aligned | 1.34 | 29.32 | $4.5 \times 10^{-11}$ |
| Aligned | 1.47 | 32.68 | $5.6 \times 10^{-11}$ |

While the present invention has been illustrated by the description of the embodiments thereof, and while the embodiments have been described in detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the breadth or scope of the applicant's concept. Furthermore, although the present invention has been described in connection with a number of exemplary embodiments and implementations, the present invention is not so limited but rather covers various modifications and equivalent arrangements, which fall within the purview of the appended claims.

What is claimed is:
1. A method for alignment of high aspect ratio materials (HARMs) comprising:
creating a matrix material comprising HARMs and a plurality of magnetic particles admixed therein; and aligning said HARMs parallel to a direction, wherein the aligning step includes causing said plurality of magnetic particles to traverse through the HARMs in said direction and gather at one side of a container for said matric material, by applying a magnetic field to said one side of the container for said matrix material, the magnetic field being aligned parallel to said direction, and said magnetic field drawing said magnetic particles through said HARMs to said one side of said container wherein said HARMs comprise one or more of nanotubes, nanofibers, nanorods, or nanowires, and wherein said method further comprises removing said plurality of magnetic particles from said one side of said container.

2. The method according to claim 1, wherein said plurality of magnetic particles are selected from a group consisting of magnetic, paramagnetic, ferrimagnetic, ferromagnetic, diamagnetic and superparamagnetic particles, and combinations thereof.

3. The method according to claim 1, wherein said plurality of magnetic particles comprises a material selected from a group consisting of iron, nickel, cobalt, and alloys thereof.

4. The method according to claim 1 wherein said matrix material comprises a polymeric material with said plurality of magnetic particles dispersed therethrough.

5. The method according to claim 1, wherein the strength of the applied magnetic field is less than one Tesla.

6. The method according to claim 1, wherein the strength of the applied magnetic field is in the range about 0.1 to about 1.0 Tesla.

7. The method according to claim 1, wherein the strength of the applied magnetic field is in the range about 0.1 to about 0.5 Tesla.

8. The method according to claim 1, wherein the magnetic field is formed using at least one magnet.

9. The method according to claim 8, wherein said at least one magnet and said magnetic field are fixed relative to said matrix material.

10. The method according to claim 8, wherein said at least one magnet is mobile and wherein applying the magnetic field comprises passing the least one magnet over said matrix material a plurality of times.

11. The method according to claim 8, wherein the magnetic field is formed using at least two magnets.

12. The method according to claim 1, wherein the magnetic field is formed using at least one solenoid.

13. The method according to claim 1, wherein the HARMs remaining after said removing are essentially free of said magnetic particles.

14. The method according to claim 1, wherein the removing of said plurality of magnetic particles from said one side of said container includes making an incision, and
wherein a portion of said matrix material at said one end of said container is removed by cutting, said portion containing essentially all of said magnetic particles.

15. The method according to claim 1, wherein the removing said plurality of magnetic particles from said one side of said container includes an extraction, and wherein the method further comprises:
applying another magnet to said matrix material at said one end of said container, to pull said magnetic particles out, and
wherein said another magnet extracts essentially all of said magnetic particles.

16. The method according to claim 15, wherein said another magnet is applied substantially orthogonally to said matrix material at said one end.

17. The method according to claim 15, wherein said extraction involves immersing said another magnet within said matrix material at said one end where the magnetic particles are accumulated and pulling said magnetic particles out,
wherein said matrix material is pliable.

18. The method according to claim 17, wherein the matrix material is a molten polymer or a polymer solution with said magnetic particles admixed therethrough.

19. The method according to claim 1, wherein said creating a matrix material comprises stirring said matrix material, to evenly disperse said plurality of magnetic particles throughout the HARMs.

20. The method according to claim 1, wherein said HARMs have approximately no magnetic susceptibility.

* * * * *